United States Patent
Lee et al.

(10) Patent No.: US 10,085,128 B2
(45) Date of Patent: Sep. 25, 2018

(54) FILE DOWNLOAD METHOD FOR MOBILE DEVICE, SERVER AND MOBILE DEVICE THEREOF, AND COMPUTER-READABLE MEDIUM

(75) Inventors: Po-Yen Lee, Taoyuan County (TW); Chien-Wen Chen, Taoyuan County (TW); Pai-Chang Yeh, Taoyuan County (TW); Li-Wen Lian, Taoyuan County (TW)

(73) Assignee: HTC Corporation, Taoyuan ( * ) Notice: Subject to any disclaimer, the term of this patent is extended or adjusted under 35 U.S.C. 154(b) by 1070 days.

(21) Appl. No.: 13/087,377

(22) Filed: Apr. 15, 2011

(65) Prior Publication Data

US 2011/0258292 A1 Oct. 20, 2011

Related U.S. Application Data

(60) Provisional application No. 61/324,303, filed on Apr. 15, 2010.

(51) Int. Cl.
*G06F 15/16* (2006.01)
*H04W 4/18* (2009.01)
*H04L 29/08* (2006.01)

(52) U.S. Cl.
CPC ........... *H04W 4/18* (2013.01); *H04L 67/1002* (2013.01)

(58) Field of Classification Search
CPC ......... G06F 17/30905; G06F 17/30056; G06F 17/30017
USPC ........................................................ 709/219
See application file for complete search history.

(56) References Cited

U.S. PATENT DOCUMENTS

| | | | | |
|---|---|---|---|---|
| 6,990,534 B2 * | 1/2006 | Mikhailov et al. | ........... | 709/250 |
| 7,177,881 B2 * | 2/2007 | Schwesig et al. | | |
| 7,216,227 B2 * | 5/2007 | Grynberg | ...................... | 713/162 |
| 7,275,082 B2 * | 9/2007 | Pang | ............................. | 709/206 |
| 7,395,339 B2 * | 7/2008 | Kirkland | ....................... | 709/229 |
| 7,647,413 B2 * | 1/2010 | Kirkland | ....................... | 709/229 |
| 7,779,408 B1 * | 8/2010 | Papineau | ...................... | 717/178 |

(Continued)

FOREIGN PATENT DOCUMENTS

| | | |
|---|---|---|
| CN | 101019404 | 8/2007 |
| CN | 101540784 | 9/2009 |

(Continued)

OTHER PUBLICATIONS

"Office Action of European Counterpart Application", dated Jun. 26, 2012, p. 1-p. 7, in which the listed reference was cited.

(Continued)

*Primary Examiner* — Hua Fan
(74) *Attorney, Agent, or Firm* — JCIPRNET

(57) ABSTRACT

A file download method for a mobile device, a server and a mobile device thereof, and a computer-readable medium are provided. In the method, the server obtains file identification information according to an access operation of a terminal device on a service website. When the file identification information corresponds to a file of a first type, the server transmits the file of the first type to the mobile device directly. When the file identification corresponds to a file of a second type, the server transmits the file identification information to the mobile device, so that the mobile device downloads the file of the second type according to the file identification information.

10 Claims, 2 Drawing Sheets

(56) References Cited

U.S. PATENT DOCUMENTS

| | | | |
|---|---|---|---|
| 7,873,609 B2* | 1/2011 | Kim et al. | 707/694 |
| 7,877,497 B2* | 1/2011 | Kirkland | 709/229 |
| 7,937,417 B2* | 5/2011 | Seymour | 707/805 |
| 7,949,677 B2* | 5/2011 | Croft et al. | 707/781 |
| 7,983,662 B1* | 7/2011 | Ramer et al. | 455/418 |
| 8,090,768 B2* | 1/2012 | Johnson et al. | 709/203 |
| 8,112,504 B2* | 2/2012 | Logan et al. | 709/219 |
| 8,284,714 B2* | 10/2012 | Ray | 370/328 |
| 8,380,786 B2* | 2/2013 | Hoffert et al. | 709/203 |
| 8,447,838 B2* | 5/2013 | Matsumura et al. | 709/219 |
| 8,489,702 B2* | 7/2013 | Batson et al. | 709/217 |
| 2003/0212762 A1* | 11/2003 | Barnes et al. | 709/219 |
| 2005/0091539 A1* | 4/2005 | Wang et al. | 713/201 |
| 2005/0122345 A1 | 6/2005 | Kirn et al. | |
| 2006/0015580 A1* | 1/2006 | Gabriel et al. | 709/219 |
| 2006/0031303 A1* | 2/2006 | Pang | 709/206 |
| 2006/0168126 A1* | 7/2006 | Costa-Requena et al. | 709/219 |
| 2006/0230030 A1* | 10/2006 | Volpa et al. | 707/3 |
| 2007/0226260 A1* | 9/2007 | Williams et al. | 707/104.1 |
| 2008/0039058 A1* | 2/2008 | Ray | 455/414.3 |
| 2008/0214215 A1* | 9/2008 | Aaltonen et al. | 455/466 |
| 2009/0205000 A1* | 8/2009 | Christensen et al. | 725/61 |
| 2010/0036830 A1* | 2/2010 | Lee | 707/5 |
| 2010/0131895 A1* | 5/2010 | Wohlert | 715/811 |
| 2010/0191806 A1* | 7/2010 | Kim et al. | 709/203 |
| 2010/0223359 A1* | 9/2010 | Runstedler et al. | 709/219 |
| 2010/0235473 A1* | 9/2010 | Koren et al. | 709/219 |
| 2010/0287112 A1* | 11/2010 | Hawkins | 705/345 |
| 2011/0030031 A1* | 2/2011 | Lussier et al. | 726/1 |
| 2011/0072114 A1* | 3/2011 | Hoffert et al. | 709/219 |
| 2011/0295978 A1* | 12/2011 | Pazos et al. | 709/219 |
| 2012/0059910 A1* | 3/2012 | Cassidy | 709/219 |
| 2012/0204107 A1* | 8/2012 | Salinas | 715/716 |
| 2014/0172839 A1* | 6/2014 | Christoph | G06F 17/30887 707/723 |

FOREIGN PATENT DOCUMENTS

| | | |
|---|---|---|
| TW | I235946 | 7/2005 |
| TW | 200828910 | 7/2008 |
| TW | 201009618 | 3/2010 |

OTHER PUBLICATIONS

"European Search Report of Europe Counterpart Application", dated Nov. 9, 2011, p. 1-p. 3, in which the listed references were cited.

"Office Action of Taiwan Counterpart Application", dated May 2, 2014, p. 1-p. 7, in which the listed reference was cited.

"Office Action of China Counterpart Application", dated Mar. 19, 2014, p. 1-p. 6, in which the listed reference was cited.

"Office Action of Taiwan Counterpart Application", dated Jan. 22, 2014, p. 1-p. 8, in which the listed references were cited.

"Office Action of China Counterpart Application", dated Sep. 29, 2014, p. 1-p. 7, in which the listed reference was cited.

* cited by examiner

FILE DOWNLOAD METHOD FOR MOBILE DEVICE, SERVER AND MOBILE DEVICE THEREOF, AND COMPUTER-READABLE MEDIUM

CROSS-REFERENCE TO RELATED APPLICATION

This application claims the priority benefit of U.S. Provisional Application Ser. No. 61/324,303, filed Apr. 15, 2010. The entirety of the above-mentioned patent application is hereby incorporated by reference herein and made a part of this specification.

BACKGROUND

Field of the Invention

The invention relates to a file download method. Particularly, the invention relates to a file download method for a mobile device, a server and a mobile device thereof, and a computer-readable medium.

Description of Related Art

With development of technology, mobile communication devices become indispensable tools in people's daily life. Besides researching and developing device functions, the manufacturers also provide online services for users to download desktops, ring tones and application programs, so as to provide diversified operation feelings. However, as types and the number of files capable of being downloaded to the mobile communication device are increased, a user has to spend a lot of time and effort to find suitable files from a large number of the files.

Besides it is not easy to find the suitable files, regarding a current mechanism for downloading the desktops and the ring tones through the online service, the user has to download the desktops or the ring tones to a computer system first, and connect the mobile communication device to the computer system before transferring the desktops or the ring tones downloaded to the computer system to the mobile communication device.

Moreover, the mobile communication device has a smaller screen size and a slower network access speed due to limitation of appearance and hardware thereof, and if the user wants to use the mobile communication device to browse all of the files that can be downloaded, the user cannot clearly view contents of the files due to the excessively small screen size. When the required files are searched, a lot of time has to be spent for waiting a searching result, which is inconvenient in utilization.

SUMMARY OF THE INVENTION

Accordingly, the invention provides a file download method for a mobile device, a server and a mobile device using the same and a computer-readable medium, by which inconvenience of downloading files to the mobile device is mitigated.

The invention provides a file download method for a mobile device, in the method, a server obtains a file identification information according to an access operation of a terminal device on a service website. When the file identification information corresponds to a file of a first type, the server transmits the file of the first type to the mobile device.

According to another aspect, the invention provides a mobile device including a storage unit, a wireless communication module and a processing module. The wireless communication module is used for connecting the mobile device to a server providing a service website, and the server obtains file identification information according to an access operation of a terminal device on the service website. The processing module is coupled to the storage unit and the wireless communication module. When the file identification information corresponds to a file of a first type, the processing module receives the file of the first type from the server through the wireless communication module, and stores the file of the first type to the storage unit.

According to another aspect, the invention provides a server including a data transmission module and a service providing module coupled to each other. The service providing module is used for providing a service website, and obtains file identification information according to an access operation of a terminal device on the service website. When the file identification information corresponds to a file of a first type, the service providing module controls the data transmission module to transmit the file of the first type to a mobile device.

The invention provides a computer-readable medium including at least one program instruction adapted to be loaded to a mobile device, where the at least one program instruction is loaded to the mobile device to execute at least steps of: connecting a server providing a service website, wherein the server obtains a file identification information according to an access operation of a terminal device on the service website, when the file identification information corresponds to a file of a first type, receiving the file of the first type from the server, and when the file identification information corresponds to a file of a second type, receiving the file identification information from the server and downloading the file of the second type according to the file identification information.

The invention provides a computer-readable medium including at least one program instruction adapted to be loaded to a server, where the at least one program instruction is loaded to the server to execute at least steps of: obtaining a file identification information according to an access operation of a terminal device on a service website, when the file identification information corresponds to a file of a first type, transmitting the file of the first type to a mobile device, and when the file identification information corresponds to a file of a second type, transmitting the file identification information to the mobile device, so that the mobile device downloads the file of the second type according to the file identification information.

According to the above descriptions, the user can use the terminal device to select the files to be downloaded through the service website provided by the server. In this way, the user is unnecessary to select the files through the small screen of the mobile device, by which convenience for downloading files is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
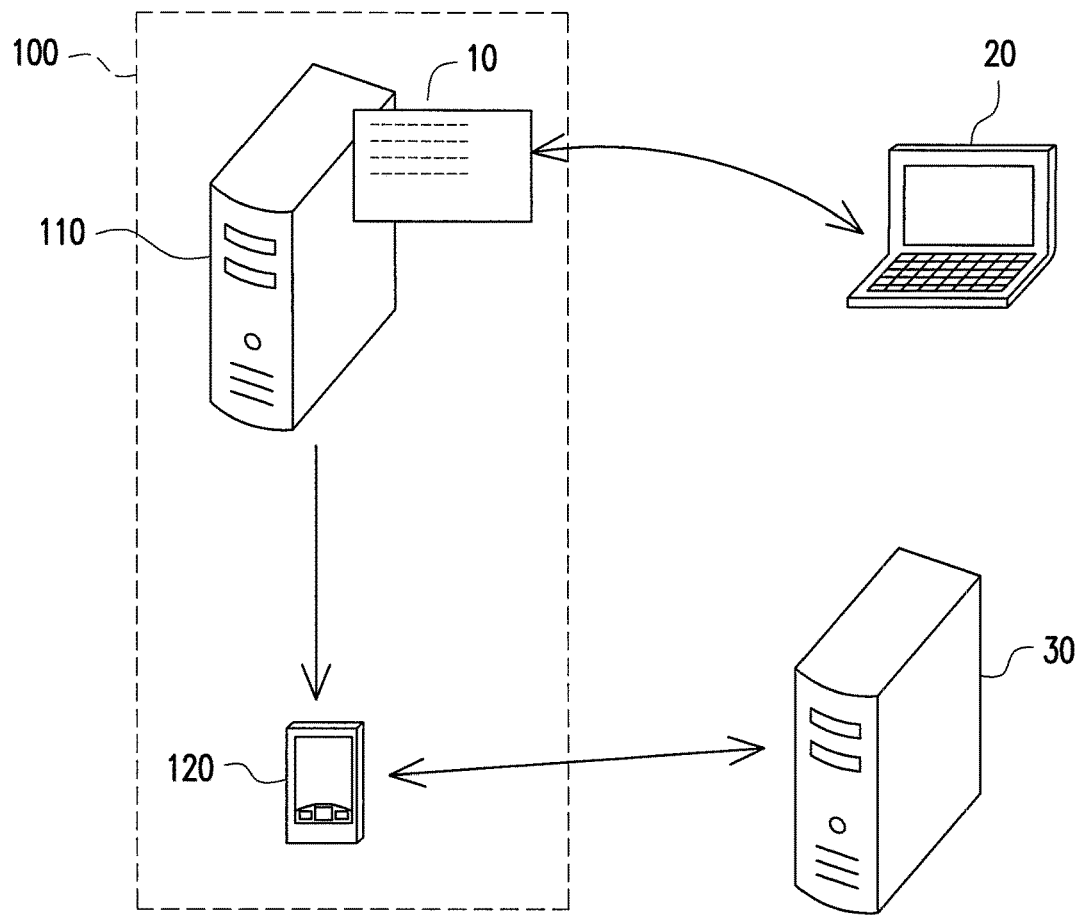
FIG. 1 is a schematic diagram illustrating a process of downloading files adapted to a mobile device according to an embodiment of the invention.

FIG. 1 is a schematic diagram illustrating a process of downloading files adapted for a mobile device according to an embodiment of the invention. Referring to FIG. 1, in the present embodiment, a user may use a browser of a terminal device 20 to connect with a service website 10 provided by a server 110, so as to browse various files (for example, desktops, ring tones, themes, panel styles, sound sets, alarm sounds, notification sounds, music and e-books, etc.) displayed on the service website 10. Moreover, the user may use the terminal device 20 to select the files to be downloaded to the mobile device 120 on the service website 10. In response to an operation of the user, the server 110 is able to directly transmit the files to the mobile device 120, or notify the mobile device 120 to connect with a file providing platform 30 for downloading the files.

In the present embodiment, the terminal device 20 may be a desktop or laptop computer, etc., though the invention is not limited thereto. Since the terminal device 20 has a larger display screen and a faster network access speed, it can be used to conveniently browse various files displayed on the service website 10. Meanwhile, the time for waiting a webpage display and a file searching result is reduced. Moreover, when the file is to be downloaded, it is unnecessary to first download the file to the terminal device 20 and then transfer the file to the mobile device 120 through the terminal device 20. In other words, the mechanism shown in FIG. 1 can improve convenience and efficiency for downloading files to the mobile device 120.

Figure 2:
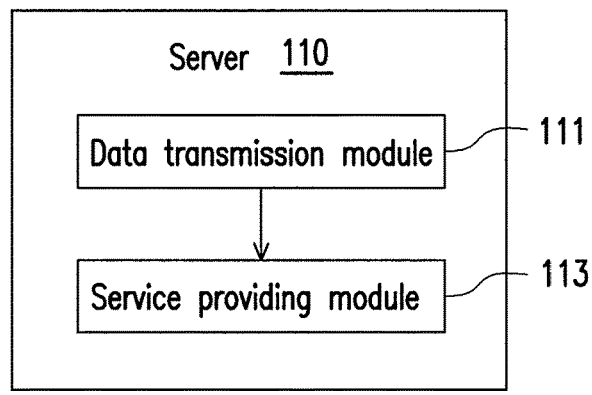
FIG. 2 is a block diagram of a server according to an embodiment of the invention.
Figure 3:
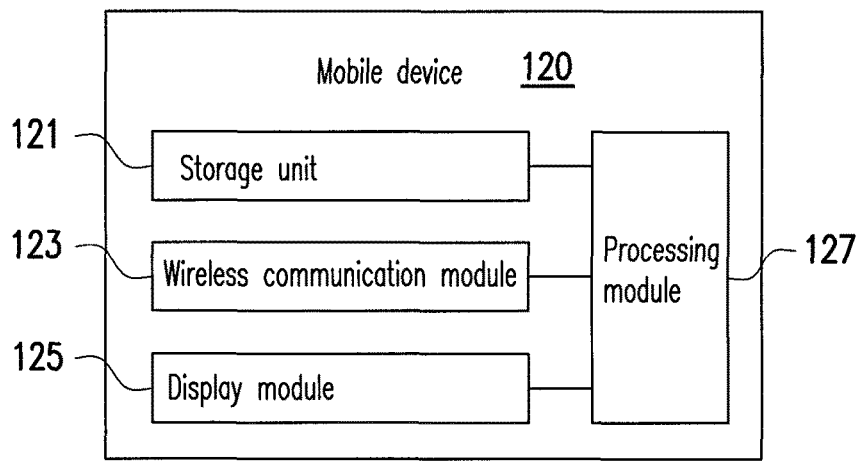
FIG. 3 is a block diagram of a mobile device according to an embodiment of the invention.

In the present embodiment, the server 110 and the mobile device 120 may form a file download system 100. FIG. 2 and FIG. 3 are respectively block diagrams of the server 110 and the mobile device 120.

First, referring to FIG. 2, the server 110 includes a data transmission module 111 and a service providing module 113 coupled to each other. For example, the server 110 is maintained by a mobile device manufacturer in order to provide the users owning the mobile devices with online services.

In detail, the server 110 may communicate with other devices through the data transmission module 111 via a wired network and/or a wireless network. For example, the data transmission module 111 may include one or the combination of an Internet module, a wireless local area network (WLAN) module, a global system for mobile communication (GSM) module, a third generation telecommunication (3G) module, a wireless fidelity (Wi-Fi) module, a worldwide interoperability for microwave access (Wi-MAX) module and a general packet radio service (GPRS) module.

The service providing module 113 is used to provide the service website 10, so that a device connected to the server 110 can use the online services provided by the server 110 through the service website 10. The service providing module 113 may be any functional module implemented by hardware and/or software, where the hardware includes a central processing unit (CPU), a chipset, a microprocessor, a controller, an application specific integrated circuit (ASIC), a programmable logic device (PLD) or a control circuit, etc., or combinations thereof, and the software may be an operating system (OS), a driving program, or an application program (AP), etc.

Referring to FIG. 3, in an embodiment, the mobile device 120 includes a storage unit 121, a wireless communication module 123 and a processing module 127. The mobile device 120 is, for example, a mobile phone, a smart phone, a personal digital assistant (PDA) or a PDA phone, etc.

The storage unit 121 may be a flash memory built in the mobile device 120, or may be various storage media such as a secure digital (SD) card, or a subscriber identity module (SIM) card, etc. externally connected to the mobile device 120 through a corresponding connector.

The wireless communication module 123 is, for example, one or the combination of a GSM module, a 3G module, a Wi-Fi module, a WiMAX module and a GPRS module.

The processing module 127 is coupled to the storage unit 121 and the wireless communication module 123. The processing module 127 is used for controlling a whole operation of the mobile device 120, which may be a CPU, or a programmable general purpose or special purpose microprocessor, a controller, an ASIC, a programmable logic device (PLD), or other similar devices or combinations thereof. The processing module 127 may also be a module such as an operating system, a driving program or an application program, etc. implemented by software. Alternatively, the processing module 127 may also be commonly implemented by software and a hardware device having a processing function.

In another embodiment, the mobile device 120 further includes a display module 125 coupled to the processing module 127. The display module 125 may be a liquid crystal display (LCD), a light-emitting diode (LED) display, a field emission display (FED), etc. Besides, the display module 125 may be a resistive touch screen or a capacitive touch screen that simultaneously has an input function and an output function, or a touch screen integrated with other touch sensing techniques.

Figure 4:
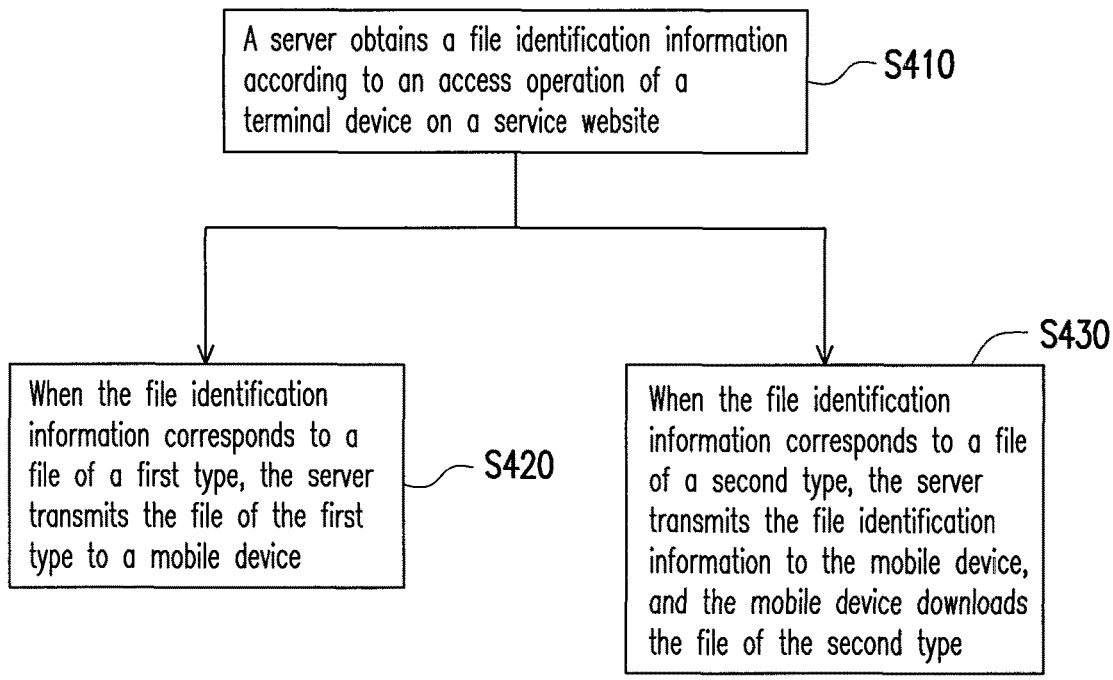
FIG. 4 is a flowchart illustrating a file download method for a mobile device according to an embodiment of the invention.

To describe an operation method of the file download system 100 in detail, another embodiment is provided below for description. FIG. 4 is a flowchart illustrating a file download method for a mobile device according to an embodiment of the invention.

In the embodiment, the server 110 selects several specific files, and displays the specific files on the service website 10. The specific files may be specific desktops, ring tones, themes, music, e-books and application programs, etc., where file types thereof are not limited by the embodiment. A part of the specific files is provided by the server 110 (which is refereed to as files of a first type). The files of the first type are stored in a hard disc (not shown) of the server 110 or able to be obtained by the server 100 through a network. Another part of the specific files is provided by other file providing platforms (for example, the file providing platform 30). Herein, the specific files that are not provided by the server 110 are referred to as files of a second type, wherein the files of the second type have to be downloaded by the mobile device 120.

When a user account of the service website 10 is set up for the mobile device 120, the terminal device 20 logs in the service website 10 by using the same user account. The service providing module 113 of the server 110 may display desktops, themes, panel styles, ring tones, sound sets, alarm sounds, notification sounds, etc. that are suitable for the mobile device 120 on the service website 10 according to a device model of the mobile device 120. For example, the desktops, themes and panel styles displayed on the service website 10 are complied with an image resolution supported by the mobile device 120, and the ring tones, sound sets, alarm sounds and notification sounds displayed on the service website 10 have a format capable of being played by the mobile device 120.

Similarly, the service providing module 113 may also display various files such as music, e-books and application programs, etc., and introductions and usage comments thereof that are suitable for the mobile device 120 on the service website 10. Taking the application programs as an example, the number of the application programs suitable for the mobile devices in the market is now more than several hundreds of thousands, and the service providing module 113 may select at least one specific application program from the large number of the application programs of the mobile device, and collect information such as content introductions and comments of the specific application programs. The method for selecting the specific application programs is not limited by the embodiment. For example, the service providing module 113 may determine the specific application programs to be displayed on the service website 10 according to conditions such as comments, download times, practicality and applicability, etc. Besides obtaining the official introductions and the comments fed back by the users, the service providing module 113 may also determine the content introductions and the comments of the specific application programs to be displayed according to test results of background operators.

After the terminal device 20 logs in the service website 10, the user is able to browse various specific files displayed on the service website 10 for selection. In step S410, the service providing module 113 obtains file identification information according to an access operation of the terminal device 20 on the service website 10. In detail, when the user selects a specific file on the service website 10, the terminal device 20 is controlled to perform a select operation to the specific file, and the service providing module 113 recognizes the file identification information of the specific file corresponding to the operation of the user according to the select operation, where each specific file has unique file identification information, which is not repeated to the file identification information of other specific files.

Then, the service providing module 113 determines the specific file selected by the user on the service website 10 is a file of the first type or a file of the second type according to the file identification information, so as to use different manners to complete the operation of downloading the file to the mobile device 120.

In detail, in step S420, when the service providing module 113 determines that the file identification information corresponds to the file of the first type, it represents that the specific file selected by the user is provided by the server 110, and the service providing module 113 directly obtains the file of the first type, and controls the data transmission module 111 to transmit the file of the first type to the mobile device 120. Accordingly, the processing module 127 of the mobile device 120 receives the file of the first type through the wireless communication module 123 and stores the file of the first type to the storage unit 121 to complete file downloading.

Moreover, in step S430, when the service providing module 113 determines that the file identification information corresponds to the file of the second type, the service providing module 113 controls the data transmission module 111 to transmit the file identification information to the mobile device 120 since the file of the second type is not provided by the server 110. Then the file of the second type is downloaded by the mobile device 120 according to the received file identification information. In detail, the processing module 127 of the mobile device 120 receives the file identification information through the wireless communication module 123, and displays a user interface on the display module 125 according to the file identification information. When a download instruction of the file of the second type is received through the user interface, the wireless communication module 123 is controlled to connect with a file providing platform that provides the file of the second type, so as to download the file of the second type to the storage unit 121.

In the following embodiment, it is assumed that the service providing module 113 displays the specific files belonged to the same file type in a list on the service website 10 for the user to browse. When the user selects one specific application program on an application program list displayed on the service website 10, the service providing module 113 switches a detail introduction page to display a content introduction and comments of the specific application program. In the embodiment, the service providing module 113 also displays a select button (or other kind of web control, which is not limited by the embodiment) on the detail introduction page. When the user selects the select button through the terminal device 20, the service providing module 113 recognizes the select operation of the terminal device 20 performed to the specific application program, and obtains the file identification information of the specific application program.

If it is determined that the specific application program is a file of the first type provided by the server 110 after analysing the file identification information, the service providing module 113 directly transmits the specific application program to the mobile device 120.

However, if it is determined that the specific application program is a file of the second type that cannot be provided by the server 110 after analysing the file identification information, the service providing module 113 controls the data transmission module 111 to transmit the file identification information to the mobile device 120. Then, after the wireless communication module 123 of the mobile device 120 receives the file identification information from the server 110, the processing module 127 may obtain a name of the specific application program according to the file identification information, and displays it on the user interface. In other words, the user interface only displays the files of the second type selected through the terminal device 20 by the user. In an embodiment, the user interface may display information such as names and prices of the files of the second type, and a time when the user selects the files of the second type on the terminal device 20.

In an embodiment, the processing module 127 may automatically download all of the files of the second type displayed on the user interface to the storage unit 121. In another embodiment, the processing module 127 determines the file to be downloaded according to an operation of the user performed on the user interface. In detail, when the user confirms a certain file of the second type to be downloaded, the user may trigger a download instruction corresponding to the foregoing file through the user interface. After that, the processing module 127 controls the wireless communication module 123 to connect with the file providing platform (for example, the file providing platform 30) that provides the file of the second type for downloading. During downloading, the processing module 127 may control the display module 125 to display a download progress of the file of the second type. Moreover, after the file of the second type is downloaded to the storage unit 121, the processing module 127 updates a content of the user interface, i.e. deletes the downloaded file from the user interface.

In an embodiment, the user may trigger a recommendation instruction corresponding to the file of the second type through the user interface, and then the processing module 127 performs a corresponding recommendation operation of the file of the second type according to the recommendation instruction, for example, sends the names of the file of the second type to contacts through messages, or automatically connect with a community website to post the names and introductions of the file of the second type.

The invention further provides a computer-readable medium, and the computer-readable medium records a plurality of program instructions. After these program instructions are loaded into the server and executed by the same, the server may implement the functions as that described above. Moreover, the invention provides another computer-readable medium, and after a plurality of program instructions recorded therein are loaded into the mobile device and executed by the same, the mobile device may complete the operations as that described above. The computer-readable medium may be a read-only memory, a random access memory, a tape, a floppy disk, a hard disk a compact disk or a transmission medium, etc., which is not limited by the embodiment.

In summary, in the invention, the server displays the selected specific files on the service website, and according to an operation of the user performed on the service website through a terminal device, it is determined whether the specific file to be downloaded by the user is provided by the server. If yes, the server directly transmits the specific file to the mobile device. If not, the file identification information of the specific file is transmitted to the mobile device, and the specific file is downloaded by the mobile device according to the file identification information. In this way, the user may use the file download service provided by the server to download the files to the mobile device through the terminal device without connecting the mobile device to the terminal device, so as to improve the file download efficiency. Moreover, since the screen size of the terminal device is larger and the network access speed thereof is faster, the user may conveniently browse and select the files to be downloaded, so as to improve convenience for downloading files to the mobile device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A file download method for a mobile device, comprising:
   (a) obtaining a file identification information of a file comprising an application program by a server according to an access operation performed on a terminal device, wherein the access operation selects the file displayed on a service website, and wherein the service website is provided by the server and displayed on a screen of the terminal device;
   (b) determining whether the file identification information corresponds to a file of a first type or a file of a second type to generate a determining result by the server;
   (c) only when the determining result is that the file identification information corresponds to the file of the first type, directly downloading the file selected through the access operation to the mobile device by the server in response to the determining result; and
   (d) only when the determining result is that the file identification information corresponds to the file of the second type, transmitting the file identification information of the file selected through the access operation to the mobile device by the server in response to the determining result and automatically downloading the file from a file providing platform according to the file identification information by the mobile device, wherein the file providing platform is not provided by the server,
   wherein the mobile device is different from the terminal device in performance,
   wherein the file is downloaded to the mobile device instead of the terminal device through the access operation performed on the terminal device which has a performance better than a performance of the mobile device, so as to improve convenience for downloading the file to the mobile device,
   wherein the file that is downloaded to the mobile device is not downloaded to the terminal device and is not transferred from the terminal device to the mobile device, so as to improve efficiency for downloading the file to the mobile device, and
   wherein the application program displayed on the service website is supported by the mobile device according to a device model of the mobile device.

2. The file download method for the mobile device as claimed in claim 1, wherein the file of the first type is provided by the server.

3. The file download method for the mobile device as claimed in claim 1, wherein the step of downloading the file by the mobile device comprises:
   displaying a user interface according to the file identification information; and
   when a download instruction corresponding to the file is received through the user interface, connecting with the file providing platform providing the file of the second type to download the file.

4. A mobile device, comprising:
   a storage unit;
   a wireless communication module, for connecting the mobile device to a server providing a service website, wherein the server obtains a file identification information of a file selected through an access operation performed on a terminal device and determines whether the file identification information corresponds to a file of a first type or a file of a second type to generate a determining result, wherein the file is displayed on a service website provided by the server and comprises an application program; and
   a processing module, coupled to the storage unit and the wireless communication module,
   wherein only when the determining result is that the file identification information corresponds to the file of the first type, the processing module directly downloads the file selected through the access operation from the server through the wireless communication module, and stores the file to the storage unit, wherein only when the determining result is that the file identification information corresponds to the file of the second type, the processing module receives the file identification information of the file selected through the access operation from the server through the wireless communication module, and automatically downloads the file from a file providing platform to the storage unit according to the file identification information, wherein the file providing platform is not provided by the server, wherein the mobile device is different from the terminal device in performance, wherein the file is downloaded to the mobile device instead of the terminal device through the access operation performed on the terminal device which has a performance better than a performance of the mobile device, so as to improve convenience for downloading the file to the mobile device, wherein the file that is downloaded to the mobile device is not downloaded to the terminal device and is not transferred from the terminal device to the mobile device, so as to improve efficiency for downloading the file to the mobile device, and wherein the application program displayed on the service website is supported by the mobile device according to a device model of the mobile device.

5. The mobile device as claimed in claim 4, wherein the file of the first type is provided by the server.

6. The mobile device as claimed in claim 4, further comprising:
a display module, coupled to the processing module,
wherein the processing module displays a user interface on the display module according to the file identification information, and controls the wireless communication module to connect with the file providing platform providing the file of the second type to download the file to the storage unit when a download instruction corresponding to the file is received through the user interface.

7. A server, comprising:
a central processing unit;
a data transmission module, coupled to the central processing unit; and
a service providing module, coupled to the data transmission module, the service providing module providing a service website displaying a file comprising an application program, and obtaining a file identification information of the file according to an access operation performed on a terminal device, wherein the access operation of the terminal device selects the file displayed on the service website,
wherein the service providing module determines whether the file identification information corresponds to a file of a first type or a file of a second type to generate a determining result,
wherein only when the determining result is that the file identification information corresponds to the file of the first type, the service providing module controls the data transmission module to directly download the file selected through the access operation to a mobile device in response to the determining result,
only when the determining result is that the file identification information corresponds to the file of the second type, the service providing module controls the data transmission module to transmit the file identification information of the file selected through the access operation to the mobile device in response to the determining result and the mobile device downloads the file from a file providing platform according to the file identification information,
wherein the file providing platform is not provided by the server,
wherein the mobile device is different from the terminal device in performance,
wherein the file is downloaded to the mobile device instead of the terminal device through the access operation performed on the terminal device which has a performance better than a performance of the mobile device, so as to improve convenience for downloading the file to the mobile device,
wherein the file that is downloaded to the mobile device is not downloaded to the terminal device and is not transferred from the terminal device to the mobile device, so as to improve efficiency for downloading the file to the mobile device, and
wherein the application program displayed on the service website is supported by the mobile device according to a device model of the mobile device.

8. The server as claimed in claim 7, wherein the file of the first type is provided by the server.

9. A non-transitory computer-readable medium, storing at least one program instruction adapted to be loaded into a mobile device, the at least one program instruction executes at least following steps after being loaded into the mobile device:
connecting with a server providing a service website, wherein an access operation of a terminal device selects a file displayed on the service website, and the server obtains a file identification information of the file selected through the access operation and determines whether the file identification information corresponds to a file of a first type or a file of a second type to generate a determining result, wherein the file comprises an application program;
only when the determining result is that the file identification information corresponds to the file of the first type, directly receiving the file selected through the access operation from the server; and
only when the determining result is that the file identification information corresponds to the file of the second type, receiving the file identification information of the file selected through the access operation from the server, and automatically downloading the file from a file providing platform according to the file identification information,
wherein the file providing platform is not provided by the server,
wherein the mobile device is different from the terminal device in performance,
wherein the file is downloaded to the mobile device instead of the terminal device through the access operation performed on the terminal device which has a performance better than a performance of the mobile device, so as to improve convenience for downloading the file to the mobile device,
wherein the file that is downloaded to the mobile device is not downloaded to the terminal device and is not transferred from the terminal device to the mobile device, so as to improve efficiency for downloading the file to the mobile device, and
wherein the application program displayed on the service website is supported by the mobile device according to a device model of the mobile device.

10. A non-transitory computer-readable medium, storing at least one program instruction adapted to be loaded into a server, the at least one program instruction executes at least following steps after being loaded into the server;

obtaining a file identification information of a file comprising an application program according to an access operation, wherein the access operation performed a terminal device selects the file displayed on a service website provided by the server;

determining whether the file identification information corresponds to a file of a first type or a file of a second type to generate a determining result;

only when the determining result is that the file identification information corresponds to the file of the first type, directly downloading the file selected through the access operation to a mobile device in response to the determining result; and only when the determining result is that the file identification information corresponds to the file of the second type, transmitting the file identification information of the file selected through the access operation to the mobile device in response to the determining result so that the mobile device automatically downloads the file from a file providing platform according to the file identification information, wherein the file providing platform is not provided by the server, wherein the mobile device is different from the terminal device in performance, wherein the file is downloaded to the mobile device instead of the terminal device through the access operation performed on the terminal device which has a performance better than a performance of the mobile device, so as to improve convenience for downloading the file to the mobile device, wherein the file that is downloaded to the mobile device is not downloaded to the terminal device and is not transferred from the terminal device to the mobile device, so as to improve efficiency for downloading the file to the mobile device, and wherein the application program displayed on the service website is supported by the mobile device according to a device model of the mobile device.

\* \* \* \* \*